(12) United States Patent
Ito et al.

(10) Patent No.: US 8,990,482 B2
(45) Date of Patent: Mar. 24, 2015

(54) MEMORY SYSTEM AND WIRELESS COMMUNICATION METHOD BY MEMORY SYSTEM

(75) Inventors: Kuniaki Ito, Chiba-ken (JP); Takashi Wakutsu, Kanagawa-ken (JP); Yasufumi Tsumagari, Kanagawa-ken (JP); Shuichi Sakurai, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 282 days.

(21) Appl. No.: 13/603,784

(22) Filed: Sep. 5, 2012

(65) Prior Publication Data
US 2013/0268720 A1 Oct. 10, 2013

(30) Foreign Application Priority Data
Apr. 6, 2012 (JP) .................................. 2012-087945

(51) Int. Cl.
*G06F 12/02* (2006.01)
*H04L 29/08* (2006.01)

(52) U.S. Cl.
CPC .................................. *H04L 67/1097* (2013.01)
USPC .................................. 711/103; 711/E12.008

(58) Field of Classification Search
USPC .......................................... 711/103, E12.008
See application file for complete search history.

(56) References Cited

U.S. PATENT DOCUMENTS

| 7,340,275 B2 | 3/2008 | Hamamura |
|---|---|---|
| 7,440,774 B2 | 10/2008 | Croome |
| 7,702,821 B2 * | 4/2010 | Feinberg et al. ................ 710/13 |
| 2001/0006902 A1 | 7/2001 | Ito |
| 2012/0209939 A1 | 8/2012 | Ito et al. |

(Continued)

FOREIGN PATENT DOCUMENTS

| EP | 1 085 395 A2 | 3/2001 |
|---|---|---|
| JP | 11-149534 | 6/1999 |
| JP | 2001-134721 | 5/2001 |

(Continued)

OTHER PUBLICATIONS

"SD Specifications Part 1 Physical Layer Simplified Specification" Technical Committee, SD Card Association, http://www.n8fan.net/item/part-1-physical-layer-simplified-specification-ver3-01/, Version 3.01 May 18, 2010, 153 pages.

(Continued)

*Primary Examiner* — Yong Choe
(74) *Attorney, Agent, or Firm* — Oblon, McClelland, Maier & Neustadt, L.L.P.

(57) ABSTRACT

A memory system includes a nonvolatile memory area including a first area in which write-in and read-out actions on data are performed and a second area in which such actions are prohibited, first and second interfaces, and a controller configured to connect to a second host using a first wireless communication configuration when the controller determines a second wireless communication configuration to connect to the second host device is not retained in the first area, the controller controlling the first interface in so that the first host device writes data into the memory area on a basis of a command provided from the second host device. When the controller changes the first wireless communication configuration, the controller connects to the second host device using the second wireless communication configuration, and the first interface notifies an error to the first host device not to write data into the memory area.

16 Claims, 2 Drawing Sheets

(56) References Cited

U.S. PATENT DOCUMENTS

2012/0210046 A1     8/2012   Ito et al.
2012/0221770 A1     8/2012   Sakurai et al.

FOREIGN PATENT DOCUMENTS

| | | |
|---|---|---|
| JP | 2001-195553 | 7/2001 |
| JP | 2001-346150 A | 12/2001 |
| JP | 2002-91709 A | 3/2002 |
| JP | 2002-132600 A | 5/2002 |
| JP | 2012-168865 A | 9/2012 |
| JP | 2012-168866 A | 9/2012 |
| JP | 2012-181611 A | 9/2012 |

OTHER PUBLICATIONS

"SD Specifications Part E1 SDIO Simplified Specification" Technical Committee, SD Card Association, https:/ /www.sdcard.org/ downloads/ pls/ simplified specs/ Part E1 SDIO Simplified Specification Ver3.00__20110225.pdf, Version 3.00, Feb. 25, 2011, 90 pages.

* cited by examiner

US 8,990,482 B2

MEMORY SYSTEM AND WIRELESS COMMUNICATION METHOD BY MEMORY SYSTEM

CROSS REFERENCE TO RELATED APPLICATION

This application is based upon and claims the benefit of priority from prior Japanese Patent Application No. 2012-087945, filed on Apr. 6, 2012, the entire contents of which are incorporated herein by reference.

FIELD

Exemplary embodiment described herein generally relates to a memory system and a wireless communication method by the memory system.

BACKGROUND

In recent years, an SD card with a function of wireless communication or a function of wireless LAN has been developed.

Such the SD card can be connected to wireless communication network by utilizing the function of wireless communication. A file stored in the SD card through the wireless communication network can be transferred, for example, by the SD card.

BRIEF DESCRIPTION OF THE DRAWINGS

Figure 1:
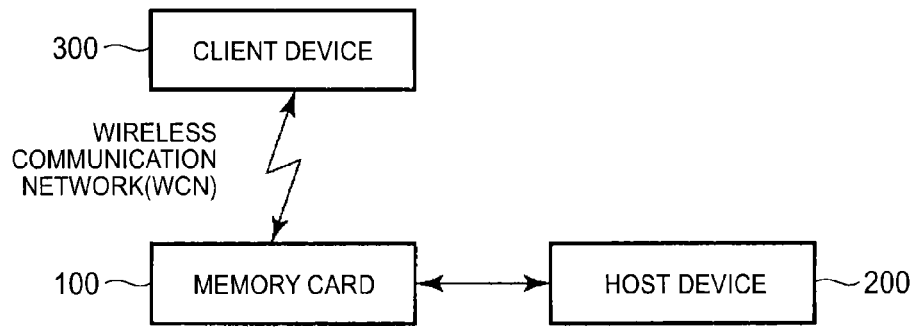
FIG. 1 is a schematic view showing a connection relation between a memory card, a host device and a client device according to an embodiment.

An aspect of the present embodiment, there is provided a memory system includes a nonvolatile memory area including a first area configured to allow to be performed a write-in action on data and a read-out action on data by a first host device and a second host device, and a second area configured to retain a first wireless communication configuration to connect to the second host device via wireless communication and configured to prohibit to be perform a write-in action on data and a read-out action on data by the first host device and the second host device, a first interface configured to connect to the first host device, a second interface configured to connect to the second host device via wireless communication, and a controller configured to connect to the second host device using the first wireless communication configuration in a case that the controller determines a second wireless communication configuration to connect to the second host device is not retained in the first area, the controller controlling the first interface in a state that the first host device writing data into the memory area on a basis of a command provided from the second host device, when the controller changes the first wireless communication configuration via the second host device, the controller copying the first wireless communication configuration into the first area after the first interface is controlled so that the first host device is configured not to write data into the memory area, generating the second wireless communication configuration by changing the first wireless communication configuration copied in the first area, and connecting to the second host device using the second wireless communication configuration, wherein the first interface notifies an error to the first host device when the first host device performs the write-in action to the memory area, in a case that the first interface is controlled so that the first host device is configured not to write data into the memory area.

Another aspect of the present embodiment, there is provided a wireless communication method by a memory system including a first interface, a second interface, a controller and a nonvolatile memory area, the nonvolatile memory area comprising a first area configured to allow to be performed a write-in action of data and a read-out action of data by the first host device and the second host device, and a second area configured to retain a first wireless communication configuration to connect to the second host device via wireless communication and configured to prohibit to be performed a write-in action of data and a read-out action of data by the first host device and the second host device includes setting the memory system in the first host device, controlling the second interface using the first wireless communication configuration by the controller to perform wireless communication between the controller and the second host device via wireless LAN in a case that the controller determines a second wireless communication configuration to connect to the second host device is configured not to be retained in the first area, issuing a command in which the memory system is configured not to write data into the nonvolatile memory area from the first host device, to the first interface by the second host device, controlling the first interface on a basis of the command provided from the second host device so that the first host device is configured not to write data into the memory area, copying the first wireless communication configuration into the first area, generating a by changing the first wireless communication configuration copied in the first area, connecting the controller to the second host device using the second wireless communication configuration, and transmitting data from the second host device to the first area.

Embodiment will be described below in detail with reference to the attached drawings. Throughout the attached drawings, similar or same reference numerals show similar, equivalent or same components. The description of the same or similar parts and elements will be performed in a case for necessity.

(Embodiment)

Figure 2:
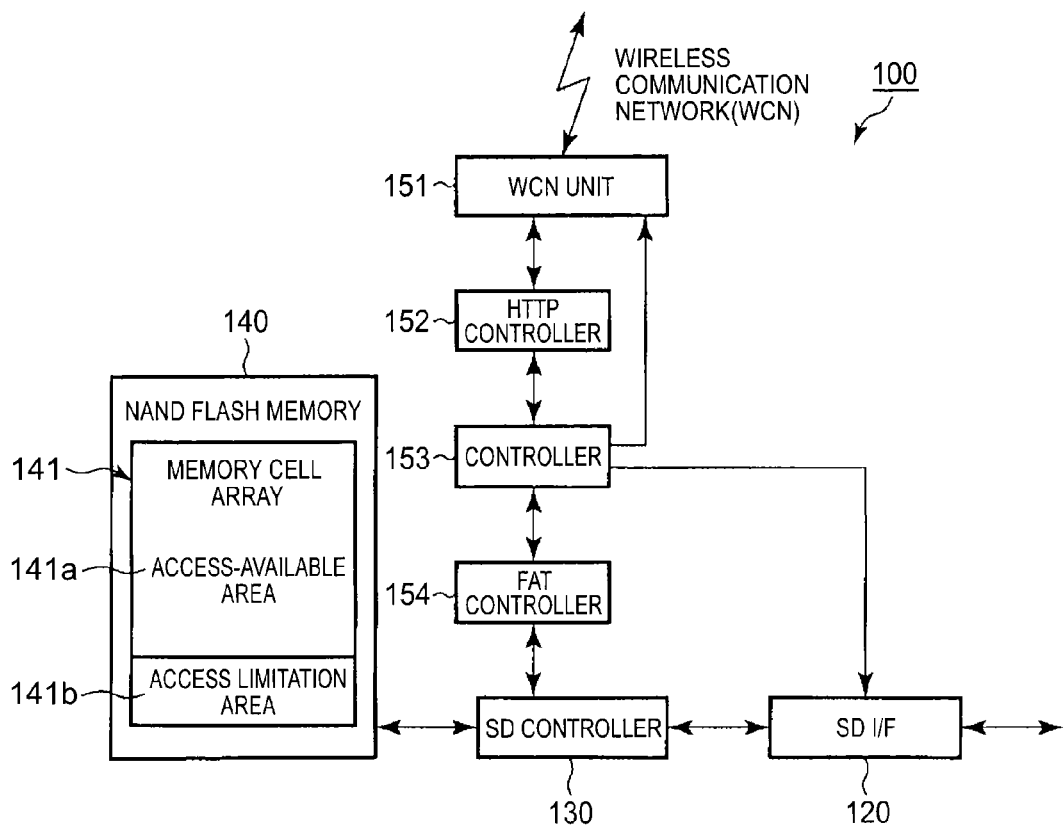
FIG. 2 is a functional block diagram showing a basic constitution of the memory card according to the embodiment.

A basic constitution of a memory card 100, for example, an SD card or the like, including a function of wireless LAN according to an embodiment is described in FIGS. 1, 2. FIG. 1 is a schematic view showing a connection relation between a memory card 100, a host device 200 and a client device 300 according to the embodiment.

FIG. 2 is a functional block diagram showing a basic constitution of the memory card 100 according to the embodiment.

<1 Constitution>

<1.1 Aspect for Basically Using SD Card Corresponding to Wireless LAN>

As shown in FIG. 1, the memory card 100 is installed in the host device 200. The memory card 100 is connected to the client device 300 through wireless communication network. Here, the memory card 100 is an SD card including wireless LAN, for example, the host device 200 is a digital camera, for example, and the client device is a personal computer or a cell phone, for example.

The memory card 100 is connected to the client device 300 through the wireless communication network by using the host device 200 so as to be able to transfer photograph data from the host device 200 to such the client device 300.

<1.2 Basic Constitution of SD Card Corresponding to Wireless LAN>

As shown in FIG. 2, the memory card 100 including a function of wireless LAN, so called merely the memory card 100 hereinafter, is connected to the host device (not shown) through an SD interface. The memory card 100 is received power supply to start action when being connected to the host device 200, so that the memory card 100 performs data processing corresponding to accesses from the host device 200.

The memory card 100 includes an SD interface (I/F) 120, an SD controller 130, a NAND-type flash memory 140, so called merely NAND flash memory or flash memory, a wireless communication (WCN) unit 151, an HTTP (Hyper Text Transport Protocol) controller 152, a controller 153 and an FAT controller (File Allocation Table) 154, for example. The SD controller 130, the HTTP controller 152, the controller 153 and the FAT controller 154 constitute a control unit.

The SD interface 120 performs interface processing between the SD controller 130 and the host device 200. Furthermore, the SD interface 120 prohibits writing data into the flash memory 140 from the host device 200 when receiving a command, which sets on "Write Protect", from the controller 153.

The SD controller 130 is received a write-in command, a read-out command, and an erase command from the host device 200 so as to access an area of the NAND flash memory 140 and to control data transfer processing.

The NAND flash memory 140 includes a memory cell array. The memory cell array includes a plurality of bit lines, a plurality of word lines and a common source line. A plurality of memory cells is located as a matrix in the memory cell array. Each of the memory cells is constituted with an EEPROM or the like, in which data is electrically rewritable, for example. Furthermore, the memory cell array 141 includes an access available area 141a and an access limitation area 141b. The access-available area 141a can be accessed by the host device 200 or the client device 300, and the access limitation area 141b is limited to be accessed by the host device 200 or the client device 300.

The host device 200 or the client device 300 can freely write into data, erase data, and read out data in the access available area 141a. In the access-limitation area 141b, the host device 200 or the client device 300 can read out data while limited to write into data and to erase data. The access available area 141a stores configuration information of a wireless communication function for communicating with the client device 300 as a file before shipment of the memory card 100.

The wireless communication unit 151, which is described as the WCN unit in FIG. 2, includes a wireless communication interface, a wireless LAN signal processing unit and an antenna receiving and transmitting high-frequency signals, and these devices are not shown. The wireless communication unit 151 controls a function of wireless communication using, for example, Wi-Fi (Trade Mark).

The HTTP controller 152 is a protocol which is used for data communication (transmission and reception) between the wireless communication unit 151 and the client device 300. The HTTP controller 152 is configured to communicate between the memory card 100 and the client device 300 including hyper text described by HTML (Hyper Text Markup Language) or XML (Extensible Markup Language) and a file of image, audio, or video related to a document with information of an expression form.

The controller 153 judges a packet or the like provided from the HTTP controller 152, so as to provide a command to the SD interface 120 and data to the FAT controller 154.

The controller controls the wireless communication unit to configure to communicate between the client device 300 and the memory card 100 on a basis of wireless communication configuration information stored in the access available area 141a or the access limitation area 141b.

The FAT controller 154 is a file system. The FAT controller 154 carries out data management or the like stored in the flash memory 140.

The host device 200 includes a host controller and issues various kinds of SD commands. The host controller carries out interface processing in a state that the memory card is connected.

The memory card uses hardware resources such as a CPU, a ROM, a RAM, a buffer or the like. The resources are simply described in detail as mentioned below. The CPU controls total action of the memory card 100. A firmware such as a control program or the like which is used as a work area of the CPU, is stored in the ROM. The RAM is used as the work area of the CPU and memorizes the control program, various kinds of tables, an extended register or the like. The buffer temporally memorize prescribed data, for example, an amount of one page, in data received from the host device 200 when writing data into the NAND flash memory, and memorizes a prescribed data in data transmitting from the host device 200 when reading out data from the NAND flash memory.

<2 Action>

<2.1 Recovery Action of Memory Card>

Figure 3:
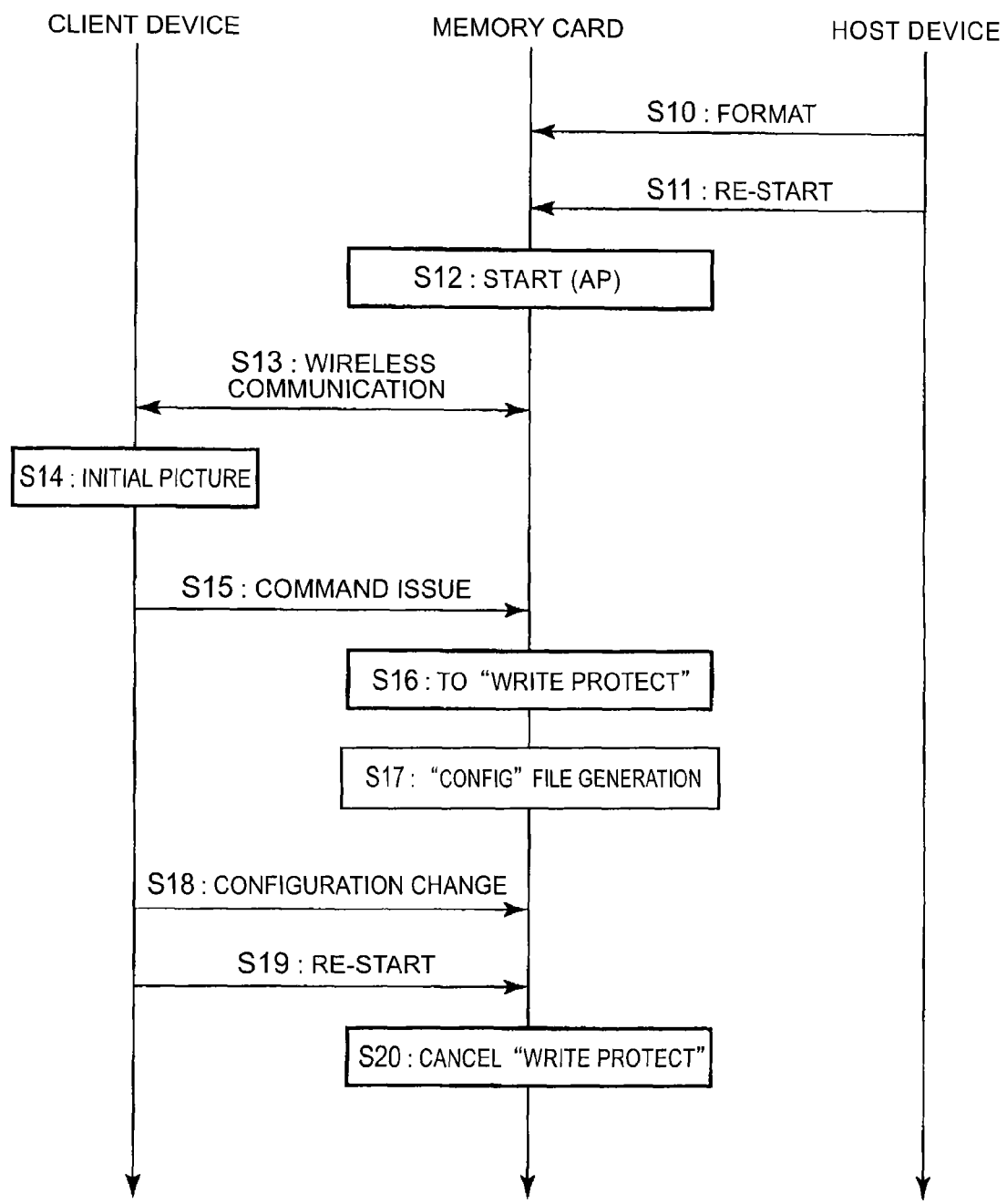
FIG. 3 is a flow chart showing a basic recovery action of the memory card after formatting memory card according to the embodiment.

A basic recovery action of the memory card 100 is described in FIG. 3 after formatting the memory card according to the embodiment. FIG. 3 is a flow chart showing a basic recovery action of the memory card 100 after formatting the memory card 100 according to the embodiment.

[Step S10] Instruction of Formatting

The host device instructs formatting the memory card 100 to conduct a formatting action of the memory card 100. In this case, information or the like configured in a "CONFIG" file which is stored in the access available area 141a of the memory cell array 141 is totally erased. On the other hand, data stored in the access limitation area 141b of the memory cell array is not formatted.

[Step S11] Instruction of Re-Starting

When the memory card 100 is re-started by the host device, the controller 153 of the memory card 100 confirms the "CONFIG" file is stored in the access available area 141a of the memory cell array 141 or not.

[Step S12] Starting as AP (Access Point)

When the controller 153 of the memory card 100 determines the "CONFIG" file is not stored in the access limitation area 141b of the memory cell array 141, the memory card conducts the same action as the action at the shipment. Specifically, the controller 153 controls the wireless communication unit 151 to be configured to start as an access point (AP) using initial wireless communication configuration preliminarily stored in the access limitation area 141b of the memory cell array before the shipment of the memory card 100.

[Step S13] Wireless Communication with SSID and Password (Initial Value)

The client device 300 can connect to the memory card 100 via wireless LAN using SSID and password (Initial Value) preliminarily configured in the access limitation area 141b of the memory card 100. Specifically, the client device 300 can access to the memory card 100 by inputting the SSID and password (Initial Value) in a web browser of the client device 300.

[Step S14] Displaying Initial Screen

On a state when the memory card 100 is ship out, the client device 300 is displayed a welcome screen, called an initial screen, which induces a screen for a user to change the SSDI & password by the memory card 100. Specifically, information for the welcome screen is retained in the access limitation area 141*b* of the memory card 100. When the user accesses a root directory of the memory card 100 via the client device, the memory card 100 provides the information for the welcome screen to the client device.

[Step S15] Issuing Command to Transfer "Write Protect" State

In a case that the user freely changes the SSDI & password for wireless communication, the user transits to a wireless communication configuration change screen according to an induction of the welcome screen displayed on the client device. In the situation, the client device prohibits a write-in action from the host device 200 to the memory card 100. In other words, when the client device 300 recognizes to transit from the welcome screen to the wireless communication configuration change screen, the client device 300 issues a CGI (Common Gateway Interface) command, which transfer the SD interface of the memory card 100 to "Write protect State", to the memory card 100.

[Step S16] Transferring to "Write Protect" State

When the controller 153 receives the CGI command for transferring to the "Write Protect" state via the wireless communication unit 151 and the HTTP controller 152, the controller 153 provides the information of the CGI command to the SD interface. Further, the SD interface puts on Write Protect function which set a state of the flash memory 140 to a write-protect state with software. In such a manner, the SD interface notifies an error to the host device when the write-in action is generated from the host device 200.

[Step S17] Generating "CONFIG" File or the Like

The client device 300, for example, issues the CGI command, which generates the "CONFIG" file, to the memory card 100. In such a manner, the controller 153 copies an initial wireless communication configuration preliminarily stored in the access limitation area 141*b* into the access available area 141*a* as the "CONFIG" file.

[Step S18] Changing Configuration of SSID & Password

The user can change the SSDI & password using the wireless communication configuration change screen displayed on the client device 300. When the user changes, information of changed SSDI & password is provided from the client device 300 to the memory card 100. The controller 153 reflects the changed SSDI & password in the information of the "CONFIG" file in the access available area 141*a*. In such a manner, the SSDI & password changed by the user is configured in the memory card 100. In a case that the "CONFIG" file is set in the access available area 141*a*, the controller 153 performs wireless communication with the client device 300 on a basis of the "CONFIG" file set in the access available area 141*a* not the initial configuration set in the access limitation area 141*b*.

Meanwhile, the user can confirm the information of the SSDI & password retained in the access available area 141*a* by performing a GET method or the like in HTTP to the memory card via the client device.

[Step S19] Instruction of Re-Starting

When the user, for example, completes wireless communication configuration using the wireless communication configuration change screen displayed on the client device 300, the client device 300 performs a re-starting instruction to the memory card 100 for cancelling the "Write Protect" state of the memory card 100.

[Step S20] Cancelling "Write Protect" State

The memory card 100 performs re-starting according to the host device 200. The memory card 100, for example, is shut for a while from a power supply by re-starting. Therefore, the "Write Protect" state of the memory card 100 is cancelled. In such a manner, the memory card returns a conventional state which allows to write-in data from the host device.

The client device 300 restarts the memory card 100 to cancel the "Write Protect" state of the memory card 100. However, it is not restricted the above case. The client device can issues a CGI command to cancel the "Write Protect" state.

<2.2 Action of SD Interface 120 in "Write Protect" State>

Furthermore, an action of the SD interface 120 to an access from the host device 200 is described below, where the memory card is set in the "Write Protect" state.

<2.2.1 Read-out Action>

The host device 200 can perform a read-out action when the memory card 100 is set in the "Write Protect" state.

When a read-out command is issued from the host device in a state that the memory card is set in the "Write Protect" state, the SD interface 120 provides data of the flash memory 140 to the host device 200, even if the area which is prepared to be read by the host device 200 is changed by the client device 300.

<2.2.2 Write-in Action>

The host device 200 can perform a write-in action when the memory card 100 is set in the "Write Protect" state.

When the write-in command is issued in a state that the memory card is set in the "Write Protect" state, the SD interface 120 notifies an error to the host device 200. In this action, the host device 200 can detect that the write-in action fails, so that the user can also recognize that the write-in action fails.

<3 Effect of the Embodiment>

The memory system (memory card) 100 includes a non-volatile memory area 140 which includes a first area (access available area) 141*a* and a second area (access limitation area) 141*b* according to the embodiment. The first area is allowed to be performed a read-out action and a write-in action of data by the first host device 100 and the second host device 300 which is called the client devices, and the second area retaining a first wireless communication configuration to connect to the second host device 300 via wireless communication, the second area is prohibited to be performed a read-out action and a write-in action of data by the first host device 100 and the second host device 300. Furthermore, the memory system 100 includes the first interface (SD interface) 120 connected to the first host device and the second interface (wireless communication unit) 151 connected to the second host device.

Furthermore, the memory system 100 includes the controller 153. The controller 153 connects to the second host device using the first wireless communication configuration in a case that the controller 153 determines the second wireless communication configuration to connect to the second host device is not retained in the first area 141. The controller 153 controls the first interface 120 in a state that the first host device cannot write data into the memory area 140 on a basis of a command provided from the second host device 300, when the controller 153 changes the first wireless communication configuration via the second host device 300. The controller 153 copies the first wireless communication configuration into the first area 141*a*, generates the second wireless communication configuration by changing the first wireless communication configuration copied in the first area 141*a*, and connects to the second host device 300 using the second wireless communication configuration. Moreover, the first interface 120 notifies an error to the first host device 200 when the first host device 200 performs the write-in action to the memory area 140, in a case that the first interface is controlled so that the first host device cannot write data into the memory area 140.

On the other hand, configuration information of wireless communication function is stored as a file in a memory card with wireless LAN function, the wireless communication configuration is performed under the information. However, a host device connected to the memory card can delete the file including the configuration information of the wireless communication function. Further, in a case that the host device is an instrument installed a camera or the like, a file including the configuration information cannot be newly generated.

Retaining such the configuration information including the wireless communication function, an SSID, a password or the like, determined by a user in the access limitation area 141*b* can be considered. The access limitation area 141*b* is not accessed by the host device. However, in a case that the password or the like is retained in the access limitation area 141*b* which the user cannot access, the user cannot access the password or the like when the user forgets the password or the like.

When a client device uploads a file or the like on a memory card via wireless communication with respect to a memory card, SD card for example, including wireless LAN function, the file is provided in a memory area. However, the upload is performed not via the host device connected to the memory card. Consequently, information with respect to the upload, which is performed by the client device, is not reflected in cash information of a file system in the host device. Therefore, when the host device provides the file system in a memory area in the memory card successively, the file system itself can be damaged.

In a case that the client device deletes a file or the like in the memory card via wireless communication with respect to the memory card, SD card for example, including wireless LAN function, the file system itself can be damaged as described above.

However, basic wireless communication configuration information to perform wireless communication is retained in the access limitation area 141*b* of the memory cell array 141 in the memory card 100 according to the embodiment as mentioned above. Accordingly, the wireless communication configuration information, which is arbitrarily changed by a user, is retained in the access available area 141*a*. As a result, the memory card 100 successively can be performed wireless communication connection when the memory card 100 is performed with a format action, because information to perform the wireless communication is not deleted. Further, when the user changes the wireless communication configuration information, CGI command, which set the SD interface 120 to be the "Write Protect" state is provided to the memory card 100 from the client device. The controller 153 transfers the SD interface 120 to the "Write Protect" state, when the controller 153 received the command. Therefore, writing-in data from the host device 200 and damaging the file including the wireless communication configuration information are prevented when the user changes the wireless communication configuration information.

(Modification)

HTTP controller 152 is described as a protocol in the embodiment mentioned above. However, it is not restricted to the HTTP controller 152. Other controller which performs protocol processing of network can be available. As the same fashion, the CGI command is used as a command provided to the controller 153 in the above embodiment. However, it is not restricted to the above command.

The client device 300 issues the command that the SD interface 120 is set as the "Write protect" state when data is written into the flash memory. The SD interface 120 is set to be the "Write protect" state when receiving the command. However, the controller 153 can automatically set the SD interface as the "Write protect" state, when the controller 153 is received a notice to change the SSDI and password from the client device 300, for example.

Writing-in from the host device 100 is prohibited by setting the SD interface 120 to the "Write protect" state in the above embodiment. However, it is not restricted the above case. Other approach which prohibits to write-in by changing the state of the SD interface can be available, for example.

Other embodiments of the present disclosure will be apparent to those skilled in the art from consideration of the specification and practice of the disclosure disclosed herein. It is intended that the specification and example embodiments be considered as exemplary only, with a true scope and spirit of the disclosure being indicated by the claims that follow. The disclosure can be carried out by being variously modified within a range not deviated from the gist of the disclosure.

What is claimed is:

1. A memory system, comprising:
   a nonvolatile memory area comprising a first area configured to allow a write-in action and a read-out action to be performed on data by a first host device and a second host device, and a second area configured to retain a first wireless communication configuration to connect to the second host device via wireless communication and configured to prohibit a write-in action and a read-out action to be performed on data by the first host device and the second host device;
   a first interface configured to connect to the first host device;
   a second interface configured to connect to the second host device via wireless communication; and
   a controller configured to connect to the second host device using the first wireless communication configuration in a case that the controller determines a second wireless communication configuration to connect to the second host device is not retained in the first area,
   the controller controlling the first interface so that the first host device is configured to not write data into the memory area on a basis of a command provided from the second host device, when the controller changes the first wireless communication configuration via the second host device,
   the controller copying the first wireless communication configuration into the first area after the first interface is controlled so that the first host device is configured not to write data into the memory area, generating the second wireless communication configuration by changing the first wireless communication configuration copied in the first area, and connecting to the second host device using the second wireless communication configuration; wherein
   the first interface notifies an error to the first host device when the first host device performs the write-in action to the memory area, in a case that the first interface is controlled so that the first host device is configured not to write data into the memory area.

2. The memory system of claim 1, wherein in a case that the controller changes the first wireless communication configuration via the second host device, the first interface automatically acts so that the first host device is configured not to write data into the memory area when the controller receives, from the host device, a notice in which the first wireless communication configuration is changed.

3. The memory system of claim 1, wherein a state in which the first host device is configured not to write data into the memory area is cancelled by an instruction of the second host device to the controller for re-starting.

4. The memory system of claim 1, wherein a state in which the first host device is configured not to write data into the memory area is cancelled by issuing a cancel command of the second host device to the controller.

5. A memory system, comprising:
a nonvolatile memory area comprising a first area configured to allow a write-in action and a read-out action to be performed on data by a first host device and a second host device, and a second area configured to retain a first wireless communication configuration to connect to the second host device via wireless communication and configured to prohibit a write-in action and a read-out action to be performed on data by the first host device and the second host device;
a first interface configured to connect to the first host device;
a second interface configured to connect to the second host device via wireless communication; and
a controller configured to connect to the second host device using the first wireless communication configuration in a case that the controller determines a second wireless communication configuration to connect to the second host device is not retained in the first area, wherein
when the controller changes the first wireless communication configuration via the second host device, the controller copies the first wireless communication configuration into the first area, generates the second wireless communication configuration by changing the first wireless communication configuration copied in the first area, and connects to the second host device using the second wireless communication configuration.

6. The memory system of claim 5, wherein when the controller changes the first wireless communication configuration via the second host device, the controller controls the first interface in a state that the first host device is configured not to write data into the memory area.

7. The memory system of claim 6, wherein when the controller changes the first wireless communication configuration via the second host device, the controller controls the first interface on a basis of a command provided from the second host device.

8. The memory system of claim 6, wherein the first interface notifies an error to the first host device when the first host device performs the write-in action to the memory area, in a case that the first interface is controlled so that the first host device is configured not to write data into the memory area.

9. The memory system of claim 5, wherein in a case that the controller changes the first wireless communication configuration via the second host device, the first interface automatically acts so that the first host device is configured not to write data into the memory area when the controller receives a notice in which the first wireless communication configuration is changed, from the second host device.

10. The memory system of claim 5, wherein a state in which the first host device is configured not to write data into the memory area is cancelled by an instruction of the second host device to the controller for re-starting.

11. The memory system of claim 5, wherein a state in which the first host device is configured not to write data into the memory area is cancelled by issuing a cancel command of the second host device to the controller.

12. A wireless communication method by a memory system, the memory system comprising a first interface, a second interface, a controller and a nonvolatile memory area, the nonvolatile memory area comprising a first area configured to allow a write-in action and a read-out action to be performed on data by the first host device and the second host device, and a second area configured to retain a first wireless communication configuration to connect to the second host device via wireless communication and configured to prohibit a write-in action and a read-out action to be performed on data by the first host device and the second host device, the method comprising:
setting the memory system in the first host device;
controlling the second interface using the first wireless communication configuration by the controller to perform wireless communication between the controller and the second host device via wireless LAN in a case that the controller determines a second wireless communication configuration to connect to the second host device is configured not to be retained in the first area;
issuing a command in which the memory system is configured not to write data into the nonvolatile memory area from the first host device, to the first interface by the second host device;
controlling the first interface on a basis of the command provided from the second host device so that the first host device is configured not to write data into the memory area;
copying the first wireless communication configuration into the first area;
generating the second wireless communication configuration by changing the first wireless communication configuration copied in the first area;
connecting the controller to the second host device using the second wireless communication configuration; and
transmitting data from the second host device to the first area.

13. The wireless communication method of claim 12, further comprising:
notifying an error from the first interface to the first host device when the first host device performs a write-in action of data to the memory area, after connecting the controller to the second device.

14. The wireless communication method of claim 12, further comprising:
transmitting data in the first area by the first interface to the second area when the first host device performs a write-in action of data to the memory area, after connecting the controller to the second device.

15. The wireless communication method of claim 12, wherein
a state, in which the first host device is configured not to write data into the memory area, is cancelled by an instruction of the second host device to the controller for re-starting.

16. The wireless communication method of claim 12, wherein
a state, in which the first host device is configured not to write data into the memory area, is cancelled by issuing a cancel command of the second host device to the controller.

* * * * *